March 15, 1927. 1,620,823

P. S. MABIE

LIQUID LEVEL INDICATOR

Filed July 8, 1925

INVENTOR.

Paul S. Mabie.

BY Gerald Baldwin

ATTORNEY.

Patented Mar. 15, 1927.

1,620,823

UNITED STATES PATENT OFFICE.

PAUL S. MABIE, OF DETROIT, MICHIGAN, ASSIGNOR OF ONE-HALF TO WILLIAM LISTON, OF DETROIT, MICHIGAN.

LIQUID-LEVEL INDICATOR.

Application filed July 8, 1925. Serial No. 42,119.

It is an object of this invention to provide a simple form of liquid level indicator for use in connection with gasoline tanks located under cowls of automobiles. The device is so arranged that with the aid of a simple system of levers a pointer on a gauge located on the instrument board may be directly operated thereby.

At the present time it is found that tanks thus located are not easy to reach, particularly for people who are not tall, without getting dirty from contact with the car, and the same objection holds good with regard to measuring devices located on the top of the tank and below the top of the cowl.

Another object of the invention is to provide a liquid level indicator consisting of two main parts; a bushing adapted to be secured to the filler opening of the tank and having operating parts so attached to it that they can be inserted through the usual opening in the top of the cowl and into the tank subsequent to their assembly in the bushing, and a gauge adapted to be fitted on an instrument board and having a pointer mounted on a rotatable rod which can be quickly and easily coupled to a second rod projecting through the side of the bushing after the two main parts have been installed in their respective locations.

A further object of the invention is to provide a liquid level indicator wherein there is ample space within the bushing for gasoline to be poured therethrough, and to provide the upper end of the bushing with thread into which the original filler cap can be screwed.

With these and other objects in view, the invention, which consists in certain novel construction and combination of parts, is hereinafter more fully described with the aid of the accompanying drawings and claimed.

Figure 1:
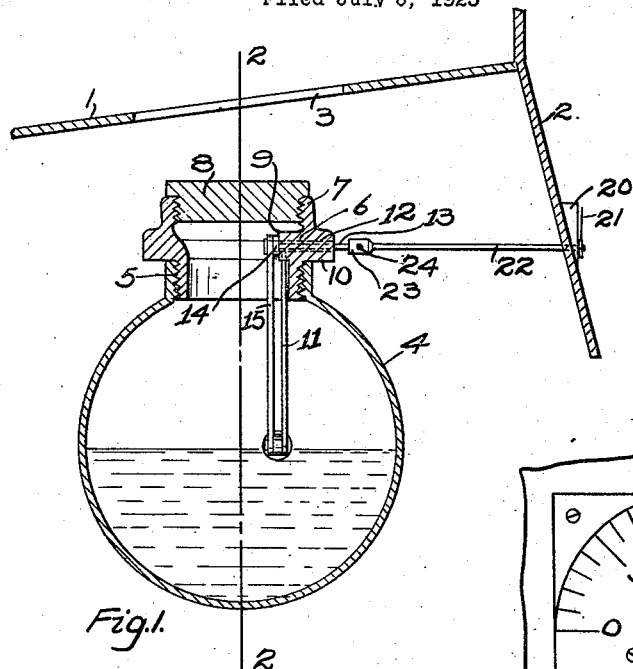
Figure 1 is a sectional elevation of the invention.
Figure 3:
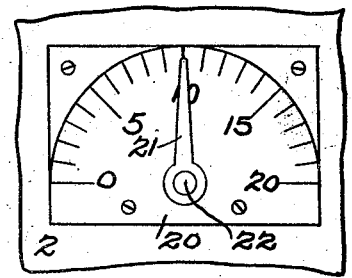
Figure 3 is a detail of the gage.
Figure 2:
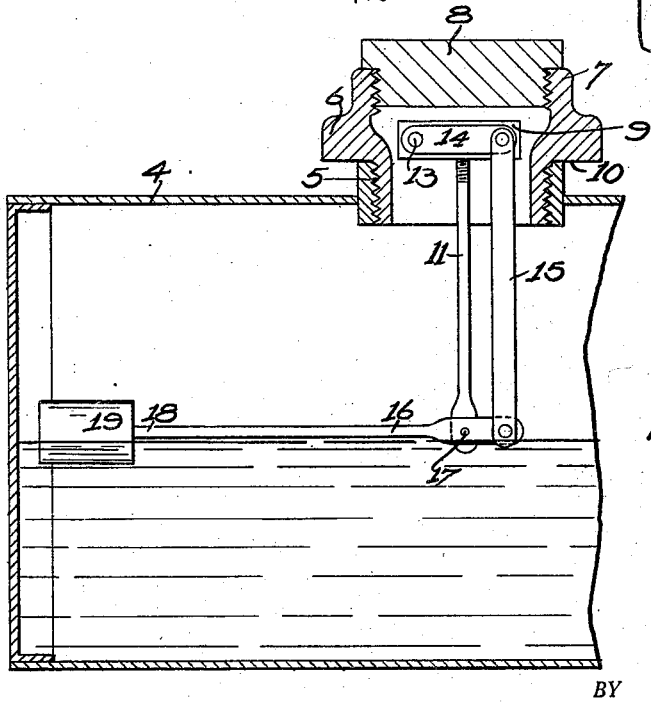
Figure 2 is a section on the line 2—2 of Figure 1.

Referring to the drawings, 1 designates part of the cowl of an automobile and 2 the instrument board; through the cowl is the usual opening 3 through which gasoline may be poured into the tank 4, the supporting means for which is not shown.

Into the ordinary threaded opening 5 of the tank a bushing 6 is screwed, the upper end 7 of which is provided with an internal thread similar to the thread in the opening 5 so that the cap 8 may be removed from its original location in the tank filler connection and secured to the upper end of the bushing.

In the bushing is an inwardly projecting surface 9, and exteriorly around the bushing is a flanged bearing surface 10 which is adapted to seat on the upper face of the opening 5. A depending element 11 is secured to the underside of the surface 9 and outwards through the flanged portion from the said surface is a passage 12. A rod 13 of such size as to be an easy sliding fit into the passage passes therethrough and has its inner end riveted or otherwise secured, to an arm 14. The other end of the arm 14 is pivotally attached to the member 15. At the lower end of the depending element 11 a lever arm 16 is pivotally mounted at 17; one end of the lever is secured to the member 15, and the other end 18 is provided with a float 19.

On the instrument board 2 a gauge 20 is arranged which is calibrated to show the number of inches of gasoline in the tank, and a pointer 21 is fastened on the rod 22 which has an enlarged end 23 into which the outer end of the rod 13 fits. The two rods are then held in engagement by a pin 24.

The operation of the device is as follows:

As the float 19 rises and falls with the level of the liquid it turns about the fulcrum point 17 and lowers and raises the member 15 and the end of the arm 14 attached to it. The arm 14 then turns the rods 13 and 22 thereby actuating the pointer 21.

It will be noted that the bushing with its parts such as the lever 16, member 15 and depending element 11 can, after assembly, be easily introduced through the cowl opening 3 and the filler opening 5, and similarly the gauge 20 with its forwardly projecting rod 22 can in a few moments be fastened to the instrument board, preferably after the two rods 13 and 22 have been coupled together. When desired the rods 13 and 22 may be made in one piece, this, however, makes the device somewhat more awkward to install, and necessitates the pointer 21 being mounted subsequent to the installation of the device.

Again a horizontally placed circular tank is shown in the drawings, and therefore mention has been made of the fact that the gauge reads in inches of depth since each inch does not contain a uniform quantity. For tanks of uniform cross section the gauges can of course be made to read in gallons.

While in the foregoing the preferred embodiment of the invention has been described and shown, it is understood that the construction is subject to such alterations as fall within the scope of the appended claim.

What I claim as my invention and desire to secure by Letters Patent is:

In a liquid level indicator for automobile tanks, the combination with a tank arranged under the cowl and having its upper end in front of an instrument board, of a bushing the lower end of which is adapted to engage a filler opening in a tank, said bushing being open at both ends and having a lateral opening therethrough, an inward projection in said bushing through which said lateral opening is formed, a depending element secured to the underside of said projection, a rod extending through and rotatably mounted in said lateral opening a link in said bushing one end of which is fixed to said rod, a lever fulcrumed on the lower end of said element, a float on one end of said lever, a member connecting the other end of said lever with the end of the link remote from said rod, said member being raised and lowered by the rise and fall of said float and turning said link and rod, a gauge on the instrument board, a pointer on said gauge, and means connecting the rod and pointer for turning said pointer by the rotation of said rod.

PAUL S. MABIE.